(12) United States Patent
Jiang et al.

(10) Patent No.: US 10,289,772 B2
(45) Date of Patent: May 14, 2019

(54) METHOD FOR CREEP-FATIGUE STRENGTH OF PLATE-FIN HEAT EXCHANGER

(71) Applicant: CHINA UNIVERSITY OF PETROLEUM (EAST CHINA), Qingdao (CN)

(72) Inventors: Wenchun Jiang, Qingdao (CN); Lei Ge, Qingdao (CN); Yucai Zhang, Qingdao (CN); Jianming Gong, Qingdao (CN); Shandong Tu, Qingdao (CN); Xuefang Xie, Qingdao (CN)

(73) Assignee: CHINA UNIVERSITY OF PETROLEUM (EAST CHINA), Qingdao (CN)

( * ) Notice: Subject to any disclaimer, the term of this patent is extended or adjusted under 35 U.S.C. 154(b) by 0 days.

(21) Appl. No.: 15/737,008

(22) PCT Filed: Sep. 15, 2017

(86) PCT No.: PCT/CN2017/101922
§ 371 (c)(1),
(2) Date: Dec. 15, 2017

(87) PCT Pub. No.: WO2018/086411
PCT Pub. Date: May 17, 2018

(65) Prior Publication Data
US 2018/0365356 A1 Dec. 20, 2018

(30) Foreign Application Priority Data
Nov. 9, 2016 (CN) .......................... 2016 1 0984992

(51) Int. Cl.
*G06G 7/48* (2006.01)
*G06F 17/50* (2006.01)
(Continued)

(52) U.S. Cl.
CPC ......... *G06F 17/5018* (2013.01); *B21D 53/02* (2013.01); *B23P 15/26* (2013.01);
(Continued)

(58) Field of Classification Search
None
See application file for complete search history.

(56) References Cited

U.S. PATENT DOCUMENTS 5,143,563 A 9/1992 Krueger et al.
2004/0226701 A1* 11/2004 Lomax, Jr. ............ F28D 7/1653
165/159
(Continued)

FOREIGN PATENT DOCUMENTS

CN 101625351 B 6/2013
CN 103761365 A * 4/2014
(Continued)

OTHER PUBLICATIONS

Mizokami, Yorikata et al., "Development of Structural Design Procedure of Plate-Fin Heat Exchanger for HTGR", Sep. 5, 2013, Nuclear Engineering and Design, Elsevier B.V. (Year: 2013).*
(Continued)

*Primary Examiner* — Cedric Johnson
(74) *Attorney, Agent, or Firm* — Buchanan Ingersoll & Rooney PC

(57) ABSTRACT

A design method for creep-fatigue strength of a plate-fin heat exchanger. The method includes preliminarily designing the plate-fin heat exchanger according to its service requirements, making a primary stress assessment for the plate-fin heat exchanger, calculating the equivalent mechanical and thermophysical parameters of the plate-fin heat exchanger core to satisfy the allowable stress requirement, performing a thermal fatigue analysis for the plate-fin heat exchanger based on these parameters and then calcu-
(Continued)

lating the fatigue life and creep life of the plate-fin heat exchanger to accomplish the comprehensive design of the plate-fin heat exchanger in the high-temperature service. The design method provides an effective method for the high temperature design of the plate-fin heat exchanger.

10 Claims, 2 Drawing Sheets

(51) Int. Cl.
*B21D 53/02* (2006.01)
*B23P 15/26* (2006.01)

(52) U.S. Cl.
CPC ...... *G06F 17/5036* (2013.01); *G06F 17/5086* (2013.01); *G06F 2217/80* (2013.01)

(56) References Cited

U.S. PATENT DOCUMENTS

| | | | | |
|---|---|---|---|---|
| 2009/0151917 | A1* | 6/2009 | Meschke | F28D 9/005 165/168 |
| 2015/0114611 | A1* | 4/2015 | Morris | F02C 7/10 165/166 |

FOREIGN PATENT DOCUMENTS

| | | |
|---|---|---|
| CN | 103761365 B | 5/2015 |
| CN | 105158084 A | 12/2015 |
| CN | 106338431 A | 1/2017 |
| CN | 106355042 A | 1/2017 |
| CN | 106503390 A | 3/2017 |
| JP | 2003-114177 A | 4/2003 |
| JP | 2005-227065 A | 8/2005 |

OTHER PUBLICATIONS

Jiang, Wenchun et al., "A Study of the Effect of Filler Metal Thickness on Tensile Strength for a Stainless Steel Plate-Fin Structure by Experiment and Finite Element Method", Dec. 1, 2009, Materials and Design 31, Elsevier, Ltd. (Year: 2009).*
Jiang, Wenchun et al., "The Effect of Filler Metal Thickness on Residual Stress and Creep for Stainless-Steel Plate-Fin Structure", 2008, International Journal of Pressure Vessels and Piping 85, Elsevier Ltd. (Year: 2008).*
Jiang, Wenchun et al., "Using Heat Sink Technology to Decrease Residual Stress in 316L Stainless Steel Welding Joint: Finite Element Simulation", 2012, International Journal of Pressure Vessels and Piping 92, Elsevier Ltd. (Year: 2012).*
Jiang, Wenchun et al., "Creep Analysis of Solid Oxide Fuel Cell with Bonded Compliant Seal Design", 2013, Journal of Power Sources 243, Elsevier B.V. (Year: 2013).*
Jiang, Wenchun et al., "Modelling of Temperature Field and Residual Stress of Vacuum Brazing for Stainless Steel Plate-Fin Structure", 2008, Journal of Materials Processing Technology 209, Elsevier B.V. (Year: 2008).*
International Search Report (Form PCT/ISA/210) dated Dec. 19, 2017, by the State Intellectual Property Office of People's Republic of China in corresponding International Application No. PCT/CN2017/101922 and translation of the International Search Report. (6 pages).
Written Opinion (Form PCT/ISA/237) dated Dec. 14, 2017, by the State Intellectual Property Office of People's Republic of China in corresponding International Application No. PCT/CN2017/101922. (4 pages).
Le, "Study of time-dependent mechanical properties of stainless steel plate-fin structure under high temperature," Science-Engineering (A), China Master's Theses Full-Text Database, Jun. 15, 2013, with an English abstract. (75 pages).
Mizokami et al., "Development of structural design procedure of plate-fin heat exchanger for HTGR," Nuclear Engineering and Design, (2013), vol. 255, pp. 248-262.

* cited by examiner

METHOD FOR CREEP-FATIGUE STRENGTH OF PLATE-FIN HEAT EXCHANGER

TECHNICAL FIELD

A design method for creep-fatigue strength of a plate-fin heat exchanger belongs to the technical field of the heat exchangers.

BACKGROUND

With the development of technology, the energy consumption is increasing, so energy saving and emission reduction as well as the improvement of the energy utilization ratio have become focuses of public attention. The heat-transfer equipment, as a core member of the high temperature system, not only requires efficient heat transfer performance, but also requires a compact structure. However, the most commonly used type of heat-transfer equipment at present is the shell and tube heat exchanger which has a large footprint and low heat transfer efficiency and it can be difficult to meet the requirements of the aerospace, high-temperature gas-cooled reactor, gas turbine and other fields using the shell and tube heat exchanger.

The plate-fin heat exchanger features a compact structure and high heat transfer efficiency. It is highly promising to study the plate-fin heat exchanger. However, the service environment of the plate-fin heat exchanger is getting worse and the high temperature and high pressure environment calls for increasingly strict design requirements for the plate-fin heat exchangers. The fracture mode is time-dependent for the service at high temperature and alternating load and the current design codes for pressure vessels are limited to the shell and tube heat exchangers and based on the elastic-plastic fracture mechanics (EPFM) theory, have neither considered the characteristics of the creep and fatigue fractures nor involved the brazing process, service environment and other factors and cannot be directly adopted for the design of the plate-fin heat exchangers.

SUMMARY OF THE INVENTION

The technical problem to be solved by the disclosed design method relates to overcoming the shortcomings of the prior art by providing a design method for creep-fatigue strength of a plate-fin heat exchanger, which makes it possible to conduct the high-temperature strength design for the plate-fin heat exchanger in consideration of the brazing process, service environment, failure positions and other factors.

The technical solution adopted solves this technical problem by relating to a design method for creep-fatigue strength of a plate-fin heat exchanger. The method includes the following steps:

Step 1: Preliminarily design the structure of the plate-fin heat exchanger according to its design temperature and design pressure requirements and define the operating temperature, number of operating cycles and service life of the plate-fin heat exchanger;

Step 2: Make a primary stress analysis for the plate-fin structure with the finite element software to identify the stress concentration parts and determine the allowable stress $S_t$;

Step 3: Judge whether the stress level of the stress concentration parts satisfies the following conditions:

$P_m \leq S_t; P_L + P_b \leq K_t * S_t;$

Where, $P_m$ means the primary membrane stress, $P_L$ means the local membrane stress, $P_b$ means the primary bending stress, $S_t$ means the time-dependent allowable stress and $K_t$ assumes a value between 1.05 and 1.16;

If these conditions are satisfied, then perform Step 4; if the primary stress is assessed unsatisfactory, change the structure and plate thickness of the plate-fin heat exchanger core and go back to Step 2;

Step 4: Carry out the creep rupture experiment and fatigue experiment on the plate-fin structure and on the aged base material in the service environment, calculate the stress magnification factor $K_\sigma$ and the strain magnification factor $K_s$ and correct the fatigue design curve and creep rupture design curve for the base material according to the experimental results;

$$K_\sigma = \frac{\sigma_B}{\sigma_B^*}, \quad K_s = \frac{\Delta_s}{\Delta_s^*},$$

Where, $\sigma_B$ and $\sigma_B^*$ mean the creep rupture strength of the base material and plate-fin structure in the same creep rupture time respectively, $\Delta_s$ and $\Delta_t^*$ mean the macro-strain range of the base material and plate-fin structure in the same fatigue life respectively;

Step 5: Acquire the equivalent mechanical parameters and equivalent thermophysical parameters of the plate-fin structure thus to perform a finite element analysis for thermal fatigue for the plate-fin heat exchanger, find the time history of the micro-stress $\sigma_{th}^*$ of the plate-fin heat exchanger core in the height direction and calculate the total strain $\Delta \varepsilon$ at the fillet, $\Delta \varepsilon = \Delta \varepsilon_{ph} + K_s \Delta \varepsilon_{th}^*,$ Where, $\Delta \varepsilon_{ph}$ means the strain range that is derived from the stress range $\Delta \sigma_{ph}$ obtained from the primary stress analysis;

$\Delta \varepsilon_{th}^*$ means the ratio of the difference between the maximum value and the minimum value of the macroscopic stress $\sigma_{th}^*$ obtained from the thermal fatigue analysis to the elastic modulus of the plate-fin heat exchanger core in the height direction;

Step 6: Calculate the fatigue damage $D_f$ and creep damage $D_c$ of the plate-fin heat exchanger core, $$D_f = \frac{N_t}{N_f(\Delta \varepsilon * K_s)},$$

Where, $N_t$ means the number of fatigue cycles, $N_f(\varepsilon)$ means the corresponding fatigue life on the corrected fatigue design curve if the strain range is $\varepsilon$;

$$D_c = N_i * \int_0^{t_h} \frac{dt}{tr[\sigma_\varepsilon^*(t) * K_\sigma]},$$

Where, $N_i$ means the number of fatigue cycles, $t_h$ means the strain retention time, $\sigma_\varepsilon^*(t)$ means the macro stress at the moment, t, $tr(\sigma)$ means the corresponding creep rupture life on the corrected creep rupture design curve if the stress is $\sigma$;

Step 7: If $D_f+D_c$ is less than 1, then perform Step 8; if $D_f+D_c$ is greater than or equal to 1, then perform Step 1; and Step 8: The design for the plate-fin heat exchanger is completed.

The allowable stress $S_t$ as described in Step 2 and Step 3 includes the allowable stress $S_{t1}$ of the fin area and the allowable stress $S_{t2}$ of the seal area.

The step of acquiring the equivalent mechanical parameters and equivalent thermophysical parameters of the plate-fin structure as described in Step 5 comprises the substeps of:

a. Dividing the plate-fin heat exchanger core into several plate-fin cells of the same shape;
b. Considering the plate-fin cells equivalent to uniform solid plates;
c. Acquiring the equivalent mechanical parameters and equivalent thermophysical parameters of a plate-fin cell, thus obtaining the equivalent mechanical parameters and equivalent thermophysical parameters of the whole plate-fin heat exchanger core.

The said equivalent mechanical parameters include the anisotropic equivalent elastic modulus, equivalent shear modulus and Poisson's ratio; the said equivalent thermophysical parameters include the equivalent thermal conductivity, equivalent coefficient of thermal expansion, equivalent density and equivalent specific heat.

The said anisotropic equivalent elastic modulus is calculated as follows:

A coordinate system is established by taking the midpoint of the bottom of the front of the plate-fin heat exchanger as its origin, taking the direction parallel to the axis of the flow path (3) in a horizontal plane as its x-axis, taking the direction perpendicular to the axis of the flow path (3) as its y-axis and taking the vertical direction as its z-axis, $$E_x = \frac{\left\{\left[l\tan\frac{a}{2} + dt + (l+d)\delta\right] - \delta(\delta+t)\tan\left(45° - \frac{a}{4}\right)\right\}}{\left[d - \delta\tan\left(45° - \frac{a}{4}\right) + l\sin\frac{a}{2}\right]\left(l\cos\frac{a}{2} + \delta + 2t\right)} E_0,$$

$$E_y = \frac{2t+\delta}{l\cos\frac{a}{2} + \delta + 2t} E_0,$$

$$E_z = \frac{\delta\left[l + \delta\tan\frac{a}{2} + \delta\tan\left(45° - \frac{a}{4}\right)\right]\cos\frac{a}{2}}{\left[d - \delta\tan\left(45° - \frac{a}{4}\right) + l\sin\frac{a}{2}\right]\left(l\cos\frac{a}{2} + \delta\right)} E_0,$$

Where, $E_x$, $E_y$ and $E_z$ mean the equivalent elastic modulus in the direction of the x-axis, y-axis and z-axis respectively, $E_0$ means the elastic modulus of the base material,
d means the width of the upper side of the flow path (3) of the plate-fin heat exchanger core, $$\frac{a}{2}$$

means the angle between the side and vertical plane of the flow path (3),
l means the length of the side of the flow path (3),
t means the thickness of the plate (1) of the plate-fin heat exchanger core, δ means the thickness of the fin (2) of the plate-fin type heat exchanger core.

The Poisson's ratio is calculated as follows:

$$v_{xz} = \frac{E_z}{E_x} v_0,$$

$$v_{xy} = \frac{E_y}{E_x} v_0,$$

$$v_{yz} = \frac{\left\{v_0(2t+\delta)\cos\frac{a}{2} + \left(l\cos\frac{a}{2} + \delta\right)\sin\frac{a}{2}\tan\frac{a}{2}\right\} E_z}{\cos\frac{a}{2}\left(2t + \delta + l\cos\frac{a}{2}\right) E_y},$$

Where, $v_{xy}$ means the ratio of the x-axis strain to the y-axis strain under the y-axis load,
$v_{xz}$ means the ratio of the x-axis strain to the z-axis strain under the z-axis load,
$v_{yz}$ means the ratio of the y-axis strain to the z-axis strain under the z-axis load,
$v_0$ means the Poisson's ratio of the base material.

The said equivalent shear modulus is calculated as follows:

A coordinate system is established by taking the midpoint of the bottom of the front of the plate-fin heat exchanger as its origin, taking the direction parallel to the axis of the flow path (3) in a horizontal plane as its x-axis, taking the direction perpendicular to the axis of the flow path (3) as its y-axis and taking the vertical direction as its z-axis, $$G_{xy} = \frac{(2t+\delta)E_0}{2\left(l\cos\frac{a}{2} + \delta + 2t\right)(1+v_0)},$$

$$G_{xz} = \frac{\left(\left[d - \delta\tan\left(45° - \frac{a}{4}\right) + l\sin\frac{a}{2}\right]\left[\delta\tan\frac{a}{2} + \delta\tan\left(45° - \frac{a}{4}\right)\right]E_0\right)}{(1+v_0)\left\{\begin{array}{c}(2t+\delta)\left[\delta\tan\frac{a}{2} + \delta\tan\left(45° - \frac{a}{4}\right)\right] + \\ l\left[d - \delta\tan\left(45° - \frac{a}{4}\right) + l\sin\frac{a}{2}\right]\end{array}\right\}},$$

$$G_{yz} = \frac{2E_0\delta^3\left(l\cos\frac{a}{2} + \delta + 2t\right)}{4\delta^3(1+v_0)(2t+\delta) + (l-2\delta)^3\left[d - \delta\tan\left(45° - \frac{a}{4}\right) + l\sin\frac{a}{2}\right]\cos\frac{a}{2}},$$

Where, $v_0$ and $E_0$ mean the Poisson's ratio and elastic modulus of the base material, respectively,
d means the width of the upper side of the flow path (3) of the plate-fin heat exchanger core, $$\frac{a}{2}$$

means the angle between the side and the vertical plane of the flow path (3),
l means the length of the side of the flow path (3),
t means the thickness of the plate (1) of the plate-fin heat exchanger core,
δ means the thickness of the fin (2) of the plate-fin type heat exchanger core.

The said equivalent thermal conductivity is calculated as follows:

A coordinate system is established by taking the midpoint of the bottom of the front of the plate-fin heat exchanger as its origin, taking the direction parallel to the axis of the flow path (3) in a horizontal plane as its x-axis, taking the direction perpendicular to the axis of the flow path (3) as its y-axis and taking the vertical direction as its z-axis, $$\lambda_x = \frac{1}{\left[l\sin\frac{a}{2} + d - \delta\sin\left(45° - \frac{a}{4}\right)\right]\left(l\cos\frac{a}{2} + \delta + 2t\right)} \left\{ \begin{array}{c} \lambda_a l\cos\frac{a}{2}\left[d - 2\delta\tan\left(45° - \frac{a}{4}\right) + l\sin\frac{a}{2}\right] + \\ \lambda_m \delta\left[l - \delta\tan\left(45° - \frac{a}{4}\right) + d\right] \end{array} \right\},$$

$$\frac{1}{\lambda_y} = \frac{1}{l\sin\frac{a}{2} + d - \delta\tan\left(45° - \frac{a}{4}\right)} \left\{ \frac{\delta}{\lambda_m} + \frac{\left[l\sin\frac{a}{2} + d - \delta\tan\left(45° - \frac{a}{4}\right) - \delta\right]\left(l\cos\frac{a}{2} + \delta + 2t\right)}{\lambda_a l\cos\frac{a}{2} + \lambda_m(2t + \delta)} \right\},$$

$$\frac{1}{\lambda_z} = \frac{1}{l\cos\frac{a}{2} + \delta + 2t} \left\{ \frac{\delta + 2t}{\lambda_m} + \frac{l\cos\frac{a}{2}\left[d - \delta\tan\left(45° - \frac{a}{4}\right) + l\sin\frac{a}{2}\right]}{\lambda_a\left[d - \delta\tan\left(45° - \frac{a}{4}\right) + l\sin\frac{a}{2} - \delta\right] + \lambda_m\delta} \right\},$$

Where, $\lambda_x$, $\lambda_y$ and $\lambda_z$ mean the equivalent thermal conductivity in the direction of the x-axis, y-axis and z-axis,
$\lambda_a$ and $\lambda_m$ mean the thermal conductivity of the base material and air respectively,
d means the width of the upper side of the flow path (3) of the plate-fin heat exchanger core, $$\frac{a}{2}$$

means the angle between the side of the flow path (3) and the vertical plane of the flow path (3),
l means the length of the side of the flow path (3),
t means the thickness of the plate (1) of the plate-fin heat exchanger core,
δ means the thickness of the fin (2) of the plate-fin type heat exchanger core;

The said equivalent coefficient of thermal expansion is calculated as follows:

A coordinate system is established by taking the midpoint of the bottom of the front of the plate-fin heat exchanger as its origin, taking the direction parallel to the axis of the flow path (3) in a horizontal plane as its x-axis, taking the direction perpendicular to the axis of the flow path (3) as its y-axis and taking the vertical direction as its z-axis, $$\alpha_z = \frac{\alpha_0}{l\cos\frac{a}{2} + 2t + \delta} \left\{ 2t + \frac{\left(l\sin\frac{a}{2} + \delta\tan\frac{a}{2}\right)\delta^2 + \left[d - 2\delta\tan\left(45° - \frac{a}{4}\right)\right]}{\left[d - 2\delta\tan\left(45° - \frac{a}{4}\right)\right]\left[d - \delta\tan\left(45° - \frac{a}{4}\right) + l\sin\frac{a}{2}\right] + \delta^2\tan\frac{a}{2}} \right\},$$

$\alpha_y = \alpha_0,$ $\alpha_x = \alpha_0,$

Where, $a_0$ means the equivalent coefficient of thermal expansion of the base material,
d means the width of the upper side of the flow path (3) of the plate-fin heat exchanger core, $$\frac{a}{2}$$

means the angle between the side of the flow path (3) and the vertical plane,
l means the length of the side of the flow path (3),
t means the thickness of the plate (1) of the plate-fin heat exchanger core,
δ means the thickness of the fin (2) of the plate-fin type heat exchanger core.

The equivalent density and equivalent specific heat are calculated as follows:

$$\beta_a = \frac{l^2\sin\frac{a}{2}\cos\frac{a}{2} + l\cos\frac{a}{2}\left[d - 2\delta\tan\left(45° - \frac{a}{4}\right)\right]}{\left(l\cos\frac{a}{2} + \delta + 2t\right)\left[d + l\sin\frac{a}{2} - \delta\tan\left(45° - \frac{a}{4}\right)\right]},$$

$\beta_m = 1 - \beta_a,$ $\overline{\rho} = \beta_m\rho_m + \beta_a\rho_a,$ $C_p = \dfrac{(1-\beta_a)\rho_m c_{p1} + \beta_a\rho_a c_{p2}}{(1-\beta_a)\rho_m + \beta_a\rho_a},$ Where, $\beta_m$ and $\beta_a$ mean the base material volume fraction and air volume fraction respectively,
$\rho_m$ and $\rho_a$ mean the base material density and air density respectively,
$c_{p1}$ and $c_{p2}$ mean the base material specific heat and air specific heat respectively,
$c_p$ and $\overline{\rho}$ mean the equivalent specific heat and equivalent density respectively,
d means the width of the upper side of the flow path (3) of the plate-fin heat exchanger core, $$\frac{a}{2}$$

means the angle between the side and the vertical plane of the flow path (3),
l means the length of the side of the flow path (3),
t means the thickness of the plate (1) of the plate-fin heat exchanger core,
δ means the thickness of the fin (2) of the plate-fin type heat exchanger core.

Compared with the prior arts, the present invention has the following beneficial effects:
1. The design method for creep-fatigue strength of a plate-fin heat exchanger comprehensively considers the influences of the brazing process, service environment, failure positions and other factors of the plate-fin heat exchanger, conducts equivalent homogenization for the plate-fin heat exchanger core, calculates the equivalent mechanical parameters and equivalent thermophysical parameters of the plate-fin heat exchanger, solves the problem that the plate-fin heat exchanger cannot be designed for high temperature strength directly with the finite element software owing to its complex periodic structure, provides a theoretical basis for the high-temperature strength design for the plate-fin heat exchanger, thus making an effective life prediction for the plate-fin heat exchangers servicing at high temperature and alternating load and providing an effective method for the design of the plate-fin heat exchanger servicing at high temperature.

2. Equivalent homogenization divides the plate-fin structure into the same plate-fin cells and considers the plate-fin cells equivalent to uniform solid plates so as to calculate the equivalent mechanical parameters and equivalent thermophysical parameters of the plate-fin structure, thereby solving the problem that it is difficult to perform the finite element simulation for the plate-fin heat exchanger owing to the periodic complex structure of the plate-fin heat exchanger so that the thermal fatigue analysis for the plate-fin heat exchanger is performed subsequently with the finite element analysis software.

3. The equivalent mechanical parameters and equivalent thermophysical parameters of the plate-fin heat exchanger core are given as an analytic expression, solving the problem that the parameters have to be acquired only through the complex computer simulation or experiment before, facilitating the calculation of the effective parameters and greatly improving the design efficiency of the plate-fin heat exchangers.

SPECIFIC EMBODIMENTS

Figure 1:
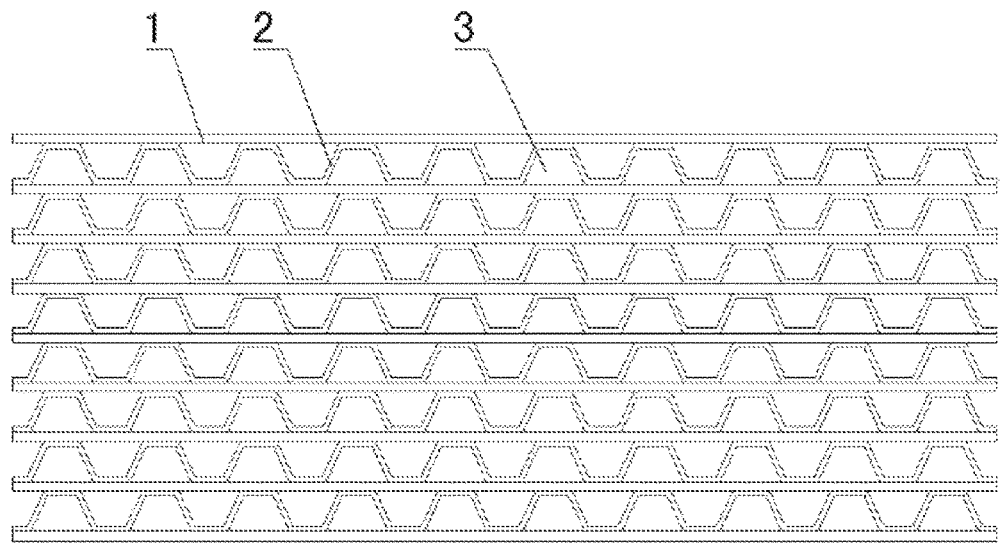
FIG. 1 illustrates a main view for the plate-fin heat exchanger core.
Figure 2:
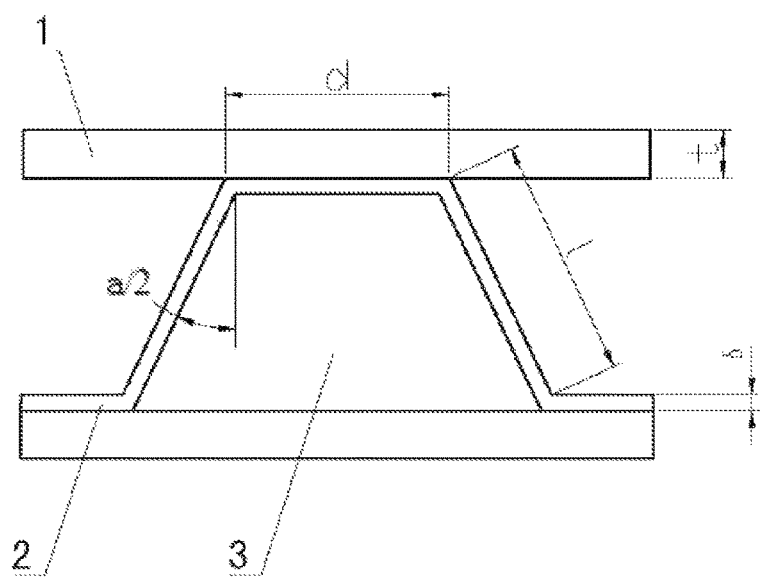
FIG. 2 illustrates a main view for the plate-fin cells.
Figure 3:
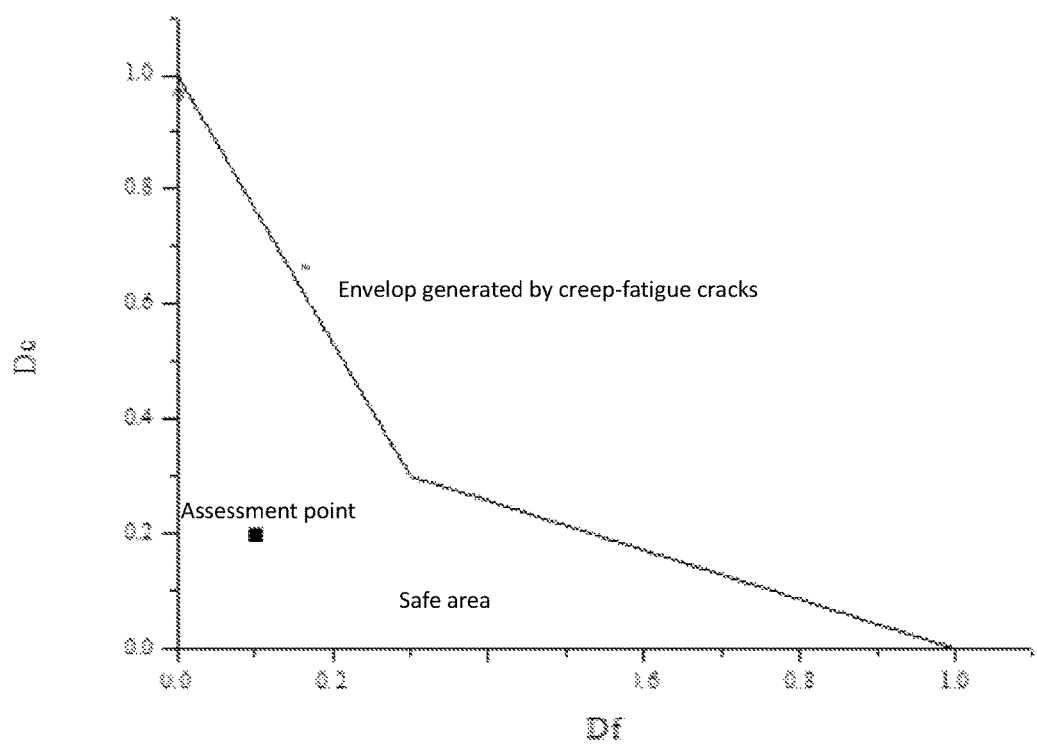
FIG. 3 illustrates a broken-line graph for the creep-fatigue life evaluation.

The preferred embodiments of this disclosure are illustrated in FIGS. 1 to 3.
The design method for creep-fatigue strength of a plate-fin heat exchanger includes the following steps:
Step 1: Preliminarily design the structure of the plate-fin heat exchanger according to its design temperature and design pressure requirements and define the operating temperature, number of operating cycles and service life of the plate-fin heat exchanger.
  The number of operating cycles is the product of the design service life and the number of annual shutdown; the service life is the design life.
  As shown in FIGS. 1 to 2, the plate-fin heat exchanger core includes plates 1 and fins 2, with the fins 2 provided between every two adjacent plates 1, and is formed through superposing and brazing several plates 1 and fins 2 in a staggered fashion, thus forming several flow paths 3 between every two adjacent plates 1 and the cross section of the flow paths 3 is an isosceles trapezoid.
Step 2: Make a primary stress analysis for the plate-fin structure with the finite element software to identify the stress concentration parts and determine the allowable stress $S_t$.
  The influence of the brazing seam on the structural stress is not taken into account during the analysis, and the brazing bonding rate is assumed to be 100%. Then, the method involves considering the thermal aging of the material in the process of brazing, service environment (such as the influence of the helium atmosphere on the material strength in the high temperature gas-cooled reactor) and seal structure, and carrying out the experimental analysis to determine the allowable stress.
  The allowable stress $S_t$ is the time-dependent allowable stress and the allowable stress $S_t$ includes the allowable stress $S_{t1}$ in the fin area and the allowable stress $S_{t2}$ in the seal area. For acquiring the allowable stress $S_{t1}$ in the fin area, uniaxial tensile and creep rupture experiments are carried out on the aged base material in the service environment (such as helium atmosphere) for the brazing high temperature and service environment. For acquiring the allowable stress $S_{t2}$ in the seal area, it is necessary to carry out the tensile strength experiment on the filler metal. Finally, according to the ASME design criteria and correction results, the method involves determining the allowable stress $S_{t1}$ in the fin area and the allowable stress $S_{t2}$ in the seal area.
  The allowable stress of the fin area takes the minimum value of the following four factors:
  ① Yield stress at design temperature*(1/1.1)*p,
  ② 67% of minimal stress resulting in the creep rupture*q,
  ③ 80% of minimal stress resulting in the start of the creep at the third stage*q, and
  ④ Minimal stress up to 1% of the total strain (elasticity, plasticity and creep).
  The strain in the seal structure is limited, the allowable strain takes one third of the fracture elongation of the filler metal and the allowable stress of the seal area takes the minimum of the following three factors:
  ② Base material yield stress at the design temperature*(1/1.1)*p,
  ③ Allowable strain*base material elastic modulus, and
  ④ 67% of minimal stress generated by creep rupture*q.
  Where, p means the ratio of the yield stress of the aged base material to that of the un-aged base material; and q means the ratio of the creep rupture strength of the aged base material to that of the unaged base material.
Step 3: Judge whether the stress level of the stress concentration parts satisfies the following conditions:

$$P_m \leq S_t; P_L + P_b \leq K_t * S_t.$$

Where, $P_m$ means the primary membrane stress, $P_L$ means the local membrane stress, $P_b$ means the primary bending stress, $S_t$ means the time-dependent allowable stress and $K_t$ takes a value between 1.05 and 1.16.
  If these conditions are satisfied, perform Step 4. If the primary stress is assessed unsatisfactory, change the structure and plate thickness of the plate-fin heat exchanger core and go back to Step 2.
  The conditions for satisfying the above-mentioned judgment conditions are as follows: the plate-fin structure fails when the stress of the stress concentration parts in the fin area reaches the allowable stress of the fin area; the seal structure fails when stress of the stress concentration parts in the seal structure reaches the allowable stress of the seal area. Failure of any of the plate-fin structure and seal structure will result in the failure of the plate-fin heat exchanger core, which needs to be redesigned to reduce the structural stress level.
  The stress is assessed with the allowable stress $S_{t1}$ of the fin area and the allowable stress $S_{t2}$ of the seal area, respectively. If the stress of the fin area satisfies the allowable stress $S_{t1}$ and the allowable stress of the seal area satisfies the allowable stress $S_{t2}$, the stress is assessed satisfactory. If the stress of the fin area does not satisfy the allowable stress $S_{t1}$ or the stress of the seal area does not satisfy the allowable stress $S_{t2}$, the stress is assessed unsatisfactory.

Step 4: Carry out the creep rupture experiment and fatigue experiment on the plate-fin structure and on the aged base material in the service environment, calculate the stress magnification factor $K_\sigma$ and the strain magnification factor $K_s$ and correct the fatigue design curve and creep rupture design curve for the base material according to the experimental results.

$$K_\sigma = \frac{\sigma_B}{\sigma_B^*}, \quad K_s = \frac{\Delta_s}{\Delta_s^*}.$$

Where, $\sigma_B$ and $\sigma^*_B$ mean the creep rupture strength of the base material and plate-fin structure in the same creep rupture time, respectively, $\Delta_s$ and $\Delta^*_s$ mean the macro-strain range of the base material and plate-fin structure in the same fatigue life, respectively.

Step 5: Acquire the equivalent mechanical parameters and equivalent thermophysical parameters of the plate-fin structure so as to make a finite element analysis for thermal fatigue for the plate-fin heat exchanger.

The plates 1 and fins 2 of the plate-fin heat exchanger core are formed through brazing, compact in structure and different from the conventional homogeneous material. The plate-fin type heat exchanger core features a periodic porous structure and the periodicity and complexity of the core structure of the heat exchanger makes it difficult to directly make the finite element analysis which must be made with the equivalent homogenization method. In order to make the finite element analysis for the plate-fin heat exchanger core, the homogenization method has been introduced.

The homogenization method means that the composite has a regular or approximate regular structure, this fairly regular heterogeneous material can be assumed to have a periodic structure, and it should be emphasized that these non-homogeneous materials are very small compared to the size of the composite. In view of this, such types of materials are sometimes referred to as the composites with periodic microstructures. However, it is quite difficult to analyze these boundary values containing a large number of heterogeneous materials even using modern high-speed computers. To overcome this difficulty, it is necessary to find a method to replace the composite with an equivalent material model and this process is called homogenization. The essence of homogenization is to replace the composite of periodic structure with the equivalent material and acquiring the performance parameters of the equivalent material is the key step of homogenization.

The step of acquiring the equivalent mechanical parameters and equivalent thermophysical parameters of the plate-fin heat exchanger core include the following substeps:

Step a. Divide the plate-fin heat exchanger core into several plate-fin cells of the same shape.

In the present embodiment, the structure shown in FIG. 2 is a plate-fin cell so that the plate-fin type heat exchanger core can be regarded as a combination of a plurality of plate-fin cells.

Step b. Consider the plate-fin cells equivalent to uniform solid plates.

Since the structure of the plate-fin cells is not uniform, the plate-fin cells are regarded as a homogeneous material, that is, the plate-fin cells are considered equivalent to uniform solid plates so as to replace the nonuniform plate-fin structure with equivalent solid plates.

Step c. Acquire the equivalent mechanical parameters and equivalent thermophysical parameters of a plate-fin cell so as to obtain the equivalent mechanical parameters and equivalent thermophysical parameters of the whole plate-fin heat exchanger core. The equivalent mechanical parameters and equivalent thermophysical parameters here may also be acquired through the finite element analysis software or experiments.

The equivalent mechanical parameters include the anisotropic equivalent elastic modulus, equivalent shear modulus and Poisson's ratio. The equivalent thermophysical parameters include the equivalent thermal conductivity, equivalent coefficient of thermal expansion, equivalent density and equivalent specific heat. A coordinate system is established by taking the midpoint of the bottom of the front of the plate-fin heat exchanger as its origin, taking the direction parallel to the axis of the flow path 3 in a horizontal plane as its x-axis, taking the direction perpendicular to the axis of the flow path 3 as its y-axis and taking the vertical direction as its z-axis so as to calculate the equivalent mechanical parameters and equivalent thermophysical parameters of the plate-fin heat exchanger core.

The equivalent elastic modulus of the plate-fin heat exchanger core is calculated as follows:

The equivalent elastic modulus in the direction of the z-axis is calculated with the balance between the force applied on the plates 1 and the force applied on the vertical portion of the fins 2, $$E_z = \frac{\delta\left[l + \delta\tan\frac{a}{2} + \delta\tan\left(45° - \frac{a}{4}\right)\right]\cos\frac{a}{2}}{\left[d - \delta\tan\left(45° - \frac{a}{4}\right) + l\sin\frac{a}{2}\right]\left(l\cos\frac{a}{2} + \delta\right)} E_0.$$

The equivalent elastic modulus in the direction of the x-axis is calculated with the concepts of the equivalent stress and actual strain, $$E_x = \frac{\left\{\left[l\tan\frac{a}{2} + dt + (l+d)\delta\right] - \delta(\delta + t)\tan\left(45° - \frac{a}{4}\right)\right\}}{\left[d - \delta\tan\left(45° - \frac{a}{4}\right) + l\sin\frac{a}{2}\right]\left(l\cos\frac{a}{2} + \delta + 2t\right)} E_0.$$

The equivalent elastic modulus in the direction of the y-axis is calculated with the concepts of the equivalent stress and actual strain, $$E_y = \frac{2t + \delta}{l\cos\frac{a}{2} + \delta + 2t} E_0.$$

Where, $E_x$, $E_y$ and $E_z$ mean the equivalent elastic modulus in the direction of the x-axis, y-axis and z-axis respectively.

$E_0$ means the elastic modulus of the base material.

d means the width of the upper side of the flow path 3 of the plate-fin heat exchanger core.

$$\frac{a}{2}$$

means the angle between the side and vertical plane of the flow path 3.

l means the length of the side of the flow path 3.

t means the thickness of the plate 1 of the plate-fin heat exchanger core.

δ means the thickness of the fin 2 of the plate-fin type heat exchanger core.

The Poisson's ratio of the plate-fin heat exchanger core is calculated as follows:

In consideration of the reinforcing function of the plates, to calculate $v_{xy}$, firstly calculate $v_{yx}$, namely, calculate the ratio of the y-axis strain to the x-axis strain under the x-axis load and then derive $v_{xy}$ from the relationship between the elastic modulus and Poisson's ratio, Namely, from $$\frac{v_{xy}}{E_y} = \frac{v_{yx}}{E_x},$$

Derive $$v_{xy} = \frac{E_y}{E_x} v_0,$$

Similarly, we have:

$$v_{xz} = \frac{E_z}{E_x} v_0,$$

$$v_{yz} = \frac{\{v_0(2t+\delta)\cos\frac{a}{2} + (l\cos\frac{a}{2}+\delta)\sin\frac{a}{2}\tan\frac{a}{2}\}E_z}{\cos\frac{a}{2}(2t+\delta+l\cos\frac{a}{2})E_y},$$

Where, $v_{xy}$ means the ratio of the x-axis strain to the y-axis strain under the y-axis load, $v_{xz}$ means the ratio of the x-axis strain to the z-axis strain under the z-axis load, $v_{yz}$ means the ratio of the y-axis strain to the z-axis strain under the z-axis load, and $v_0$ means the Poisson's ratio of the base material.

The equivalent shear modulus of the plate-fin heat exchanger core is calculated as follows:

To calculate $$G_{xy}, G = \frac{E}{2(1+v)}$$

is known for each isotropic homogeneous material,

Thus find:

$$G_{xy} = \frac{(2t+\delta)E_0}{2(l\cos\frac{a}{2}+\delta+2t)(1+v_0)},$$

Calculate $G_{xz}$ and $G_{yz}$, where both $G_{xz}$ and $G_{yz}$ mean the ratio of the equivalent shear stress to the actual shear strain, Thus find:

$$G_{xz} = \frac{\left[d - \delta\tan\left(45° - \frac{a}{4}\right) + l\sin\frac{a}{2}\right]\left[\delta\tan\frac{a}{2} + \delta\tan\left(45° - \frac{a}{4}\right)\right]E_0}{(1+v_0)\left\{\begin{array}{l}(2t+\delta)\left[\delta\tan\frac{a}{2} + \delta\tan\left(45° - \frac{a}{4}\right)\right] + \\ l\left[d - \delta\tan\left(45° - \frac{a}{4}\right) + l\sin\frac{a}{2}\right]\end{array}\right\}},$$

$$G_{yz} = \frac{2E_0\delta^3\left(l\cos\frac{a}{2} + \delta + 2t\right)}{4\delta^3(1+v_0)(2t+\delta) + (l-2\delta)^3\left[d - \delta\tan\left(45° - \frac{a}{4}\right) + l\sin\frac{a}{2}\right]\cos\frac{a}{2}},$$

Where, $v_0$ and $E_0$ mean the Poisson's ratio and elastic modulus of the base material, respectively.

The equivalent thermal conductivity of the plate-fin heat exchanger core is calculated as follows:

On the basis of the law of minimal thermal resistance, also known as the parallel law, when the heat is transferred in the object, the heat flow is passed along the channel with the least resistance, or the channel has a minimum thermal resistance state when the heat flow passes through the directional heat flow, and the total heat resistance of the corresponding channel is minimal thermal resistance, also known as equivalent thermal resistance. On the basis of the law of the equivalent thermal conductivity, when only the heat transfer is considered, and specific equivalent thermal resistance of single element of the composite is considered equal to the total thermal resistance of the composite, then the equivalent thermal conductivity of that single element is considered equal to the total thermal conductivity of the composite regardless of the size of the element.

From the description above, we can see that, to find the thermal conductivity of the whole plate-fin heat exchanger core, it is only necessary to find the equivalent thermal conductivity of a plate-fin cell.

$$\lambda_x = \frac{1}{\left[l\sin\frac{a}{2} + d - \delta\sin\left(45° - \frac{a}{4}\right)\right]\left(l\cos\frac{a}{2} + \delta + 2t\right)}$$

$$\left\{\begin{array}{l}\lambda_a l\cos\frac{a}{2}\left[d - 2\delta\tan\left(45° - \frac{a}{4}\right) + l\sin\frac{a}{2}\right] + \\ \lambda_m \delta\left[l - \delta\tan\left(45° - \frac{a}{4}\right) + d\right]\end{array}\right\},$$

$$\frac{1}{\lambda_y} = \frac{1}{l\sin\frac{a}{2} + d - \delta\tan\left(45° - \frac{a}{4}\right)}$$

$$\left\{\frac{\delta}{\lambda_m} + \frac{\left[l\sin\frac{a}{2} + d - \delta\tan\left(45° - \frac{a}{4}\right) - \delta\right]\left(l\cos\frac{a}{2} + \delta + 2t\right)}{\lambda_a l\cos\frac{a}{2} + \lambda_m(2t+\delta)}\right\},$$

-continued $$\frac{1}{\lambda_z} = \frac{1}{l\cos\frac{a}{2}+\delta+2t}\left\{\frac{\delta+2t}{\lambda_m} + \frac{l\cos\frac{a}{2}\left[d-\delta\tan\left(45°-\frac{a}{4}\right)+l\sin\frac{a}{2}\right]}{\lambda_a\left[d-\delta\tan\left(45°-\frac{a}{4}\right)+l\sin\frac{a}{2}-\delta\right]+\lambda_m\delta}\right\},$$

Where $\lambda_x$, $\lambda_y$, and $\lambda_z$ mean the equivalent thermal conductivity in the direction of the x-axis, y-axis and z-axis, respectively.

$\lambda_a$ and $\lambda_m$ mean the thermal conductivity of the base material and air, respectively.

The equivalent coefficient of thermal expansion of the plate-fin heat exchanger core is calculated as follows:

The top and bottom plates 1 of a plate-fin cell can expand freely. The fins 2 and the horizontal part and inclined part of the fins 2 interact with each other due to the difference in the expansion in the direction of the z-axis, so we have:

$$\alpha_z = \frac{\alpha_0}{l\cos\frac{a}{2}+2t+\delta}\left\{2t + \frac{\left(l\sin\frac{a}{2}+\delta\tan\frac{a}{2}\right)\delta^2 + \left[d-2\delta\tan\left(45°-\frac{a}{4}\right)\right]}{\left[d-2\delta\tan\left(45°-\frac{a}{4}\right)\right]} \cdot \frac{\left[d-\delta\tan\left(45°-\frac{a}{4}\right)+l\sin\frac{a}{2}\right]\delta}{\left[d-\delta\tan\left(45°-\frac{a}{4}\right)+l\sin\frac{a}{2}\right]+\delta^2\tan\frac{a}{2}}\right\},$$

The plates 1 and the fins 2 have the same thermal expansion in the direction of the y-axis and x-axis, so we have:

$a_y = a_0$, $a_x = a_0$,

Where, $a_0$ means the equivalent coefficient of thermal expansion of the base material.

The equivalent density and equivalent specific heat of the plate-fin heat exchanger core are calculated as follows:

$$\beta_a = \frac{l^2\sin\frac{a}{2}\cos\frac{a}{2} + l\cos\frac{a}{2}\left[d-2\delta\tan\left(45°-\frac{a}{4}\right)\right]}{\left(l\cos\frac{a}{2}+\delta+2t\right)\left[d+l\sin\frac{a}{2}-\delta\tan\left(45°-\frac{a}{4}\right)\right]},$$

$\beta_m = 1 - \beta_a$, $\bar{\rho} = \beta_m\rho_m + \beta_a\rho_a$, $$c_p = \frac{(1-\beta_a)\rho_m c_{p1} + \beta_a\rho_a c_{p2}}{(1-\beta_a)\rho_m + \beta_a\rho_a},$$

Where, $\beta_m$ and $\beta_a$ mean the base material volume fraction and air volume fraction, respectively.

$\rho_m$ and $\rho_a$ mean the base material density and air density, respectively.

$c_{p1}$ and $c_{p2}$ mean the base material specific heat and air specific heat, respectively.

$c_p$ and $\bar{\rho}$ mean the equivalent specific heat and equivalent density, respectively.

Perform the anisotropic elastic analysis for thermal fatigue with the homogenization method through the finite element analysis software using the calculated equivalent mechanical parameters and equivalent thermophysical parameters. Derive the superposition direction of the plate-fin structure from the results of thermal stress analysis, namely, the time history of the macroscopic stress $\sigma^*_{th}$ in the direction of the z-axis, $\Delta\varepsilon^*_{th}$ is the difference between the maximum value and the minimum value of the macroscopic stress, and the ratio of the difference to the elastic modulus in the direction of the z-axis is the strain range $\Delta\varepsilon^*_{th}$. The strain range $\Delta\varepsilon_{ph}$ is derived from the primary stress range $\Delta\sigma_{ph}$ so as to calculate the total strain $\Delta\varepsilon$ at the fillet, $\Delta\varepsilon = \Delta\varepsilon_{ph} + K_t\Delta\varepsilon^*_{th}$.

Step 6. Calculate the fatigue damage $D_f$ and creep damage $D_c$ of the plate-fin heat exchanger, $$D_f = \frac{N_t}{N_f(\Delta\varepsilon * K_s)}.$$

Where, $N_t$ means the number of fatigue cycles.

$N_f(\varepsilon)$ means the corresponding fatigue life on the corrected fatigue design curve when the strain range is $\varepsilon$.

$$D_c = N_i * \int_0^{t_h} \frac{dt}{tr[\sigma^*_e(t) * K_\sigma]}.$$

Where, $N_i$ means the number of fatigue cycles.

$t_h$ means the strain retention time.

$\sigma^*_e(t)$ means the macro stress at the moment, t.

$tr(\sigma)$ means the corresponding creep rupture life on the corrected creep rupture design curve when the stress is $\sigma$.

The fatigue damage $D_f$ is the ratio of the number of operating cycles of each point of the plate-fin heat exchanger core to its number of allowable cycles at the maximum temperature of the aged base material. For calculating the creep damage $D_c$, it is better to get the stress relaxation curve of the structure, namely, $\sigma^*_e(t)$ change curve, since the stress relaxation will occur in the retention time.

Step 7. If $D_f+D_c$ is less than 1, then perform step 8; if $D_f+D_c$ is greater than or equal to 1, then perform Step 1.

According to the ASME creep-fatigue damage assessment criteria, as shown in FIG. 3, $D_f$ is taken as the X-axis and $D_c$ is taken as the y-axis and $D_c+D_f=1$ is the envelop generated by the cracks based on the calculated total creep damage $D_c$ and total fatigue damage $D_f$. If $D_f+D_c$ is less than 1, namely, ($D_f$, $D_c$) is below the envelope, then it means that the plate-fin heat exchanger will not fail within its entire design life at design temperature and pressure and satisfies the design requirements and it is necessary to perform Step 8. If $D_f+D_c$ is greater than or equal to 1, it means that the plate-fin heat exchanger does not meet the design requirements. In this case, it is necessary to improve the structure, replace the material, reduce the service pressure and temperature under the allowable conditions and repeat Step 1 until ($D_f$, $D_c$) is below the envelope so that the high temperature strength design for the plate-fin heat exchanger is completed.

Step 8. The design for the plate-fin heat exchanger is completed.

The descriptions above are merely preferred embodiments of the present invention and shall not be regarded as any other form of restrictions on the present invention and the technical contents disclosed above may be modified or developed by any technician skilled in the art to the equivalent embodiments with equivalent change. However, any and all simple modifications, equivalent changes and developments that are made to the above-mentioned embodiments based on the technical essence of the present invention without being separated from the contents of the technical solutions of the present invention are still covered by the protection scope of the technical solution of the present invention.

What is claimed is:

1. A design method for creep fatigue strength of a plate-fin heat exchanger, wherein the method comprises the following steps:

Step 1: preliminarily designing a structure of the plate-fin heat exchanger according to its design temperature and design pressure requirements and defining operating temperature, number of operating cycles and service life of the plate-fin heat exchanger;

Step 2: making a primary stress analysis for the plate-fin structure with a finite element software to identify stress concentration parts and determining allowable stress $S_t$;

Step 3: judging whether a stress level of the stress concentration parts satisfies the following conditions:

$$P_m \leq S_t; P_L + P_b \leq K_t * S_t;$$

wherein, $P_m$ means primary membrane stress, $P_L$ means local membrane stress, $P_b$ means the primary bending, stress, $S_t$ means time-dependent allowable stress and $K_t$ assumes a value between 1.05 and 1.16;

if these conditions are satisfied, then performing Step 4; and if the primary stress is assessed unsatisfactory, chancing the structure and plate thickness of the plate-fin heat exchanger core and going back to Step 2;

Step 4: carrying out creep rupture experiment and fatigue experiment on the plate-fin structure and on an aged base material in service environment, calculating stress magnification factor $K_\sigma$ and strain magnification factor $K_s$ and correcting fatigue design curve and creep rupture design curve for the base material according to the calculated results of $K_\sigma$ and $K_s$;

$$K_\sigma = \frac{\sigma_B}{B_B^*}, K_s = \frac{\Delta_s}{\Delta_s^*},$$

wherein, and $\sigma_B$ mean $\sigma^*_B$ rupture strength of the base material and plate-fin structure in a same creep rupture time respectively, $\Delta_t$ and $\Delta^*_t$ mean a macro-strain range of the base material and plate-fin structure in a same fatigue life respectively;

Step 5: acquiring equivalent mechanical parameters and equivalent thermophysical parameters of the plate-fin structure thus to perform a finite element analysis for thermal fatigue for the plate-fin heat exchanger, finding a time history of micro-stress $\sigma^*_{th}$ of the plate-fin heat exchanger core in a height direction and calculating a total strain $\Delta \varepsilon$ at a fillet, $$\Delta \varepsilon = \Delta \varepsilon_{ph} + K_s \Delta \varepsilon^*_{th},$$

wherein, $\Delta \varepsilon_{ph}$ means a strain range that is derived from a stress range $\Delta \sigma_{ph}$ obtained from the primary stress analysis;

$\Delta \varepsilon^*_{th}$ means a ratio of a difference between a maximum value and a minimum value of the macro stress $\sigma^*_{th}$ obtained from the thermal fatigue analysis to an elastic modulus of the plate-fin heat exchanger core in the height direction;

Step 6: calculating fatigue damage $D_f$ and creep damage $D_c$ of the plate-fin heat exchanger core, $$D_f = \frac{N_t}{N_f(\Delta \varepsilon * K_s)},$$

wherein, $N_t$ means a number of fatigue cycles, $N_f(\varepsilon)$ means a corresponding fatigue life on the corrected fatigue design curve if the strain range is $\varepsilon$;

$$D_c = N_i * \int_0^{t_h} \frac{dt}{tr[\sigma_e^*(t) * K_\sigma]},$$

wherein, $N_i$ means a number of fatigue cycles, $t_h$ means strain retention time, $\sigma_\varepsilon^*(t)$ means macro stress at the moment, t, $tr(\sigma)$ means a corresponding creep rupture life on the corrected creep rupture design curve if the stress is a:

Step 7: if $D_f + D_c$ is less than 1, design requirements for the plate-fin heat exchanger are satisfied and then performing Step 8: if $D_f + D_c$ is greater than or equal to 1, then performing Step 1 exchanger;

Step 8: completing the design of the plate-fin heat exchanger, based on satisfying the design requirements.

2. The design method for creep fatigue strength of a plate-fin heat exchanger according to claim 1, wherein, the allowable stress $S_t$ as described in Step 2 and Step 3 includes allowable stress $S_{t1}$ of a fin area and allowable stress $S_{t2}$ of a seal area.

3. The design method for creep fatigue strength of a plate-fin heat exchanger according to claim 1, wherein, the step of acquiring the equivalent mechanical parameters and equivalent thermophysical parameters of the plate-fin heat exchanger core as described in Step 5 comprises the sub-steps of:

a. dividing the plate-fin heat exchanger core into multiple plate-fin cells of a same shape;

b. considering the plate-fin cells equivalent to uniform solid plates;

e. acquiring equivalent mechanical parameters and equivalent thermophysical parameters of one of the multiple plate-fin cells, thus obtaining equivalent mechanical parameters and equivalent thermophysical parameters of the whole plate-fin heat exchanger core.

4. The design method for creep fatigue strength of a plate-fin heat exchanger according to claim 3, wherein, the equivalent mechanical parameters include anisotropic equivalent elastic modulus, equivalent shear modulus and Poisson's ratio; the equivalent thermophysical parameters include equivalent thermal conductivity, equivalent coefficient of thermal expansion, equivalent density and equivalent specific heat.

5. The design method for creep fatigue strength of a plate-fin heat exchanger according to claim 4, wherein, the anisotropic equivalent elastic modulus is calculated as follows:

a coordinate system is established by taking a midpoint of a bottom of a front of the plate-fin heat exchanger as its origin, taking the at direction parallel to an axis of a flow path in a horizontal plane as its x-axis, taking a direction perpendicular to the axis of the flow path as its y-axis and taking a vertical direction as its z-axis, $$E_x = \frac{\left\{\left[l\tan\frac{a}{2} + dt + (l+d)\delta\right] - \delta(\delta+t)\tan\left(45° - \frac{a}{4}\right)\right\}}{\left[d - \delta\tan\left(45° - \frac{a}{4}\right) + l\sin\frac{a}{2}\right]\left(l\cos\frac{a}{2} + \delta + 2t\right)} E_0,$$

$$E_y = \frac{2t+\delta}{l\cos\frac{a}{2} + \delta + 2t} E_0,$$

$$E_z = \frac{\delta\left[l + \delta\tan\frac{a}{2} + \delta\tan\left(45° - \frac{a}{4}\right)\right]\cos\frac{a}{2}}{\left[d - \delta\tan\left(45° - \frac{a}{4}\right) + l\sin\frac{a}{2}\right]\left(l\cos\frac{a}{2} + \delta\right)} E_0,$$

wherein $E_x$, $E_y$ and $E_z$ mean equivalent elastic modulus in the directions of the x-axis, y-axis and z-axis respectively,
$E_0$ means elastic modulus of the base material,
d means a width of an upper side of the flow path of the plate-fin heat exchanger core, $$\frac{a}{2}$$

means an angle between a side and vertical plane of the flow path,
l means a length of the side of the flow path,
t means a thickness of a plate of the plate-fin heat exchanger core,
δ means thickness of a fin of the plate-fin heat exchanger core.

6. The design method for creep fatigue strength of a plate-fin heat exchanger according to claim 5, wherein, the Poisson's ratio is calculated as follows:

$$v_{xz} = \frac{E_z}{E_x} v_0,$$

$$v_{xy} = \frac{E_y}{E_x} v_0,$$

$$v_{yz} = \frac{\left\{v_0(2t+\delta)\cos\frac{a}{2} + \left(l\cos\frac{a}{2} + \delta\right)\sin\frac{a}{2}\tan\frac{a}{2}\right\}E_s}{\cos\frac{a}{2}\left(2t + \delta + l\cos\frac{a}{2}\right)E_y},$$

wherein, $v_{xy}$ means a ratio of x-axis strain to y-axis strain under a y-axis load,
$v_{xz}$ means a ratio of the x-axis strain to z-axis strain under a z-axis load,
$v_{yx}$ means a ratio of the y-axis strain to the z-axis strain under the z-axis load,
$v_0$ means a Poisson's ratio of the base material.

7. The design method for creep fatigue strength of a plate-fin heat exchanger-according to claim 4, wherein, the equivalent shear modulus is calculated as follows:
a coordinate system is established by taking a midpoint of a bottom of a front of the plate-fin heat exchanger as its origin, taking a direction parallel to an axis of a flow path in a horizontal plane as its x-axis, taking a direction perpendicular to the axis of the flow path as its y-axis and taking a vertical direction as its z-axis, $$G_{xy} = \frac{(2t+\delta)E_0}{2\left(l\cos\frac{a}{2} + \delta + 2t\right)(1+v_0)},$$

$$G_{xz} = \frac{\left[d - \delta\tan\left(45° - \frac{a}{4}\right) + l\sin\frac{a}{2}\right]\left[\delta\tan\frac{a}{2} + \delta\tan\left(45° - \frac{a}{4}\right)\right]E_0}{(1+v_0)\left\{\begin{array}{l}(2t+\delta)\left[\delta\tan\frac{a}{2} + \delta\tan\left(45° - \frac{a}{4}\right)\right] + \\ l\left[d - \delta\tan\left(45° - \frac{a}{4}\right) + l\sin\frac{a}{2}\right]\end{array}\right\}},$$

$$G_{yz} = \frac{2E_0\delta^3\left(l\cos\frac{a}{2} + \delta + 2t\right)}{4\delta^3(1+v_0)(2t+\delta) + (l-2\delta)^3\left[d - \delta\tan\left(45° - \frac{a}{4}\right) + l\sin\frac{a}{2}\right]\cos\frac{a}{2}},$$

wherein, $v_0$ and $E_0$ mean Poisson's ratio and elastic modulus of the base material, respectively,
d means a width of an upper side of the flow path of the plate-fin heat exchanger core, $$\frac{a}{2}$$

means an angle between a side and a vertical plane of the flow path,
l means a length of the side of the flow path,
t means a thickness of a plate of the plate-fin heat exchanger core,
δ means a thickness of a fin of the plate-fin heat exchanger core.

8. The design method for creep fatigue strength of a plate-fin heat exchanger according to claim 4, wherein, the equivalent thermal conductivity is calculated as follows:
a coordinate system is established by taking a midpoint of a bottom of a front of the plate-fin heat exchanger as its origin, taking a direction parallel to an axis of a flow path in a horizontal plane as its x-axis, taking a direction perpendicular to the axis of the flow path as its y-axis and taking a vertical direction as its z-axis, $$\lambda_x = \frac{1}{\left[l\sin\frac{a}{2} + d - \delta\sin\left(45° - \frac{a}{4}\right)\right]\left(l\cos\frac{a}{2} + \delta + 2t\right)} \left\{\begin{array}{l}\lambda_a l\cos\frac{a}{2}\left[d - 2\delta\tan\left(45° - \frac{a}{4}\right) + l\sin\frac{a}{2}\right] + \\ \lambda_m\delta\left[l - \delta\tan\left(45° - \frac{a}{4}\right) + d\right]\end{array}\right\},$$

$$\frac{1}{\lambda_y} = \frac{1}{l\sin\frac{a}{2} + d - \delta\tan\left(45° - \frac{a}{4}\right)} \left\{\frac{\delta}{\lambda_m} + \frac{\left[l\sin\frac{a}{2} + d - \delta\tan\left(45° - \frac{a}{4}\right) - \delta\right]\left(l\cos\frac{a}{2} + \delta + 2t\right)}{\lambda_a l\cos\frac{a}{2} + \lambda_m(2t+\delta)}\right\},$$

$$\frac{1}{\lambda_z} = \frac{1}{l\cos\frac{a}{2} + \delta + 2t}\left\{\frac{\delta + 2t}{\lambda_m} + \frac{l\cos\frac{a}{2}\left[d - \delta\tan\left(45° - \frac{a}{4}\right) + l\sin\frac{a}{2}\right]}{\lambda_a\left[d - \delta\tan\left(45° - \frac{a}{4}\right) + l\sin\frac{a}{2} - \delta\right] + \lambda_m\delta}\right\},$$

wherein, $\lambda_x$, $\lambda_y$ and $\lambda_z$ mean equivalent thermal conductivity in the directions of the x-axis, y-axis and z-axis, respectively,
$\lambda_a$ and $\lambda_m$ mean thermal conductivity of the base material and air respectively, d means a width of an upper side of the flow path of the plate-fin heat exchanger core, $$\frac{a}{2}$$

means an angle between a side of the flow path and a vertical plane of the flow path, l means a length of the side of the flow path, t means a thickness of a plate of the plate-fin heat exchanger core, δ means a thickness of a fin of the plate-fin heat exchanger core.

9. The design method for creep fatigue strength of a plate-fin heat exchanger according to claim 4, wherein, the equivalent coefficient of thermal expansion is calculated as follows:

a coordinate system is established by taking a midpoint of a bottom of a front of the plate-fin, heat exchanger as its origin, taking a direction parallel to an axis of a flow path in a horizontal plane as its x-axis, taking a direction perpendicular to the axis of the flow path as its y-axis and taking a vertical direction as its z-axis, $$a_s = \frac{a_0}{l\cos\frac{a}{2} + 2t + \delta}$$

$$\left\{ 2t + \frac{\left(l\sin\frac{a}{2} + \delta\tan\frac{a}{2}\right)\delta^2 + \left[d - 2\delta\tan\left(45° - \frac{a}{4}\right)\right]\left[d - \delta\tan\left(45° - \frac{a}{4}\right) + l\sin\frac{a}{2}\right]\delta}{\left[d - 2\delta\tan\left(45° - \frac{a}{4}\right)\right]\left[d - \delta\tan\left(45° - \frac{a}{4}\right) + l\sin\frac{a}{2}\right] + \delta^2\tan\frac{a}{2}} \right\},$$

$$a_y = a_0,$$
$$a_x = a_0,$$

wherein, $a_0$ means equivalent coefficient of thermal expansion of the base material, d means a width of an upper side of the flow path of the plate-fin heat exchanger core, $$\frac{a}{2}$$

means an angle between a side of the flow path and a vertical plane, l means a length of the side of the flow path, t means a thickness of a plate of the plate-fin heat exchanger core, δ means a thickness of a fin of the plate-fin heat exchanger core.

10. The design method for creep fatigue strength of a plate-fin heat exchanger according to claim 4, wherein, the equivalent density and equivalent specific heat are calculated as follows:

$$\beta_a = \frac{l^2\sin\frac{a}{2}\cos\frac{a}{2} + l\cos\frac{a}{2}\left[d - 2\delta\tan\left(45° - \frac{a}{4}\right)\right]}{\left(l\cos\frac{a}{2} + \delta + 2t\right)\left[d + l\sin\frac{a}{2} - \delta\tan\left(45° - \frac{a}{4}\right)\right]},$$

$$\beta_m = 1 - \beta_a,$$

$$\overline{\rho} = \beta_m\rho_m + \beta_a\rho_a,$$

$$c_p = \frac{(1-\beta_a)\rho_m c_{p1} + \beta_a\rho_a c_{p2}}{(1-\beta_a)\rho_m + \beta_a\rho_a},$$

wherein, $\beta_m$ and $\beta_a$ mean base material volume fraction and air volume fraction respectively, $\rho_m$ and $\rho_a$ mean base material density and air density respectively, $c_{p1}$ and $c_{p2}$ mean base material specific heat and air specific heat respectively, $c_p$ and $\overline{\rho}$ mean equivalent specific heat and equivalent density respectively, d means a width of an upper side of a flow path of the plate-fin heat exchanger core, $$\frac{a}{2}$$

means an angle between aside and a vertical plane of the flow path, l means a length of the side of the flow path, t means a thickness of a plate of the plate-fin heat exchanger core, δ means a thickness of a fin of the plate-fin heat exchanger core.

* * * * *

UNITED STATES PATENT AND TRADEMARK OFFICE
CERTIFICATE OF CORRECTION

PATENT NO. : 10,289,772 B2
APPLICATION NO. : 15/737008
DATED : May 14, 2019
INVENTOR(S) : Wenchun Jiang et al.

Page 1 of 1

It is certified that error appears in the above-identified patent and that said Letters Patent is hereby corrected as shown below:

On the Title Page

"(54) METHOD FOR CREEP-FATIGUE STRENGTH OF PLATE-FIN HEAT EXCHANGER" should read --(54) DESIGN METHOD FOR CREEP-FATIGUE STRENGTH OF PLATE-FIN HEAT EXCHANGER--

In the Claims

In Column 15, Line 47, "... $K_\sigma = \dfrac{\sigma_B}{B_B^*}$ ..." should read --... $K_\sigma = \dfrac{\sigma_B}{\sigma_B^*}$ ...--

In Column 15, Line 53, "... $\Delta_\tau$ and $\Delta_\tau^*$ ..." should read --... $\mathbf{\Delta_s}$ and $\mathbf{\Delta_s^*}$ ...--

In Column 15, Line 60, "...micro-stress..." should read --...macro-stress...--

In Column 16, Lines 15-16, "... $N_f(\varepsilon)$ means a corresponding fatigue life on the corrected fatigue design curve if the strain range is ε ..." should read --... $N_f$ means a corresponding fatigue life on the corrected fatigue design curve ...--

In Column 16, Lines 26-27, "... tr (σ) means a corresponding creep rupture life on the corrected creep rupture design curve if the stress is a ..." should read --... tr means a corresponding creep rupture life on the corrected creep rupture design curve ...--

Signed and Sealed this
Second Day of July, 2019

Andrei Iancu
*Director of the United States Patent and Trademark Office*